United States Patent [19]
Leshem

[11] 3,946,258

[45] Mar. 23, 1976

[54] GRIPPER TYPE LINEAR MOTION DEVICE

[75] Inventor: Adam Leshem, Bloomfield, Conn.

[73] Assignee: Combustion Engineering, Inc., Windsor, Conn.

[22] Filed: July 1, 1974

[21] Appl. No.: 484,749

[52] U.S. Cl. ................................................ 310/14
[51] Int. Cl.² ...................................... H02K 41/02
[58] Field of Search ........................... 310/12—14; 226/59, 54; 318/135

[56] References Cited
UNITED STATES PATENTS

| 3,158,766 | 11/1964 | Frisch | 310/14 |
| 3,162,796 | 12/1964 | Schreiber et al. | 310/12 X |

*Primary Examiner*—Donovan F. Duggan
*Attorney, Agent, or Firm*—Stephen L. Borst

[57] ABSTRACT

A linear motion device of the type having a plurality of gripper assemblies for engaging projections on a linearly movable element to effect stepwise movement thereof. Each of the gripper assemblies is movable into and out of engageable relationship with the element to thereby yield three relative positions between the element and the gripper assembly--a latched position, a coupled position and an unlatched position. Also, each of the gripper assemblies is movable relative to its support means between respective raised and lowered positions. The gripper assemblies are supported on the support means in spaced relationship and the projections are spacedly positioned on the element so that each gripper assembly, when in its lowered position relative to the support means, can be moved into the coupled position with respect to the element when the other gripper assembly is in its latched position and is in either its raised position or lowered position relative to the support means.

8 Claims, 29 Drawing Figures

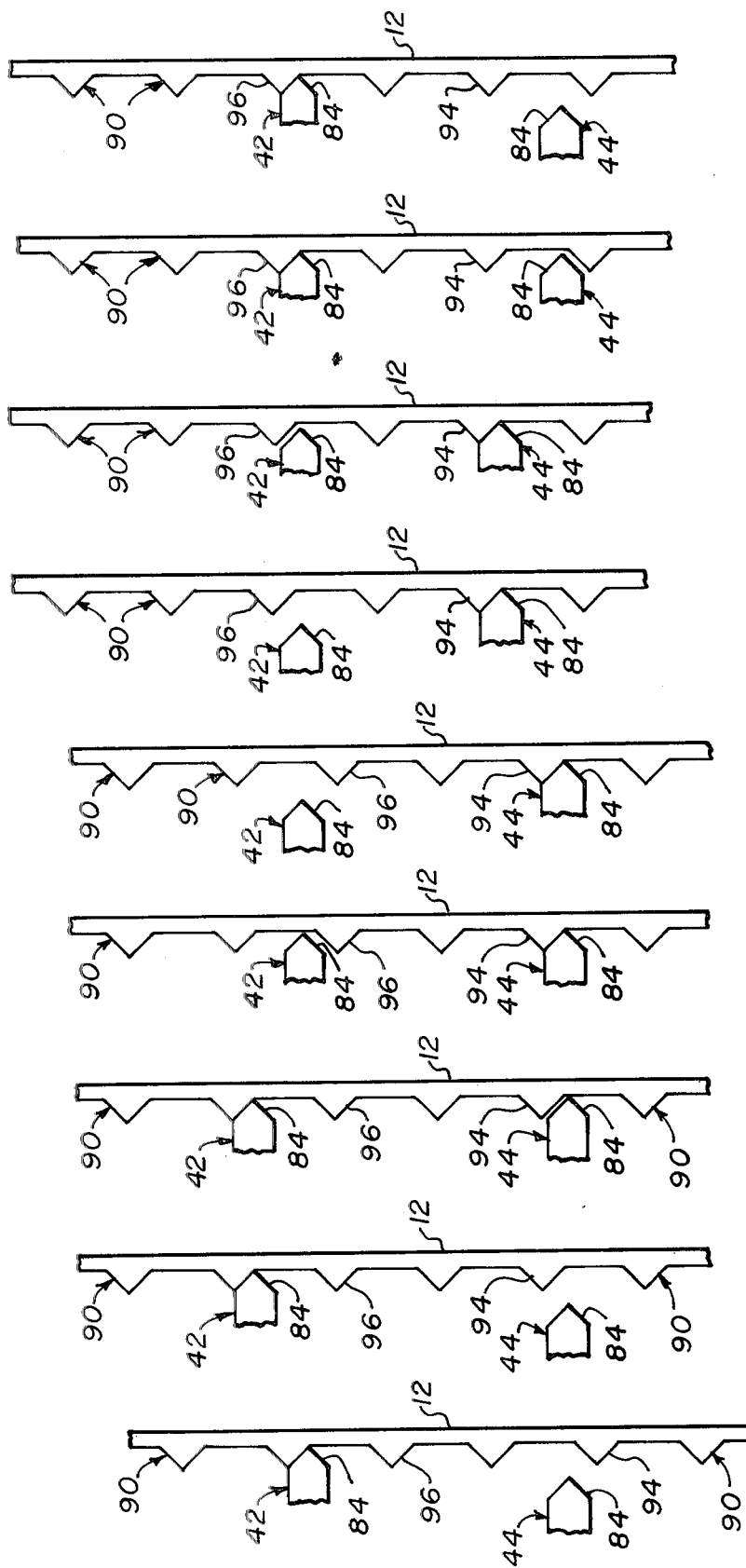

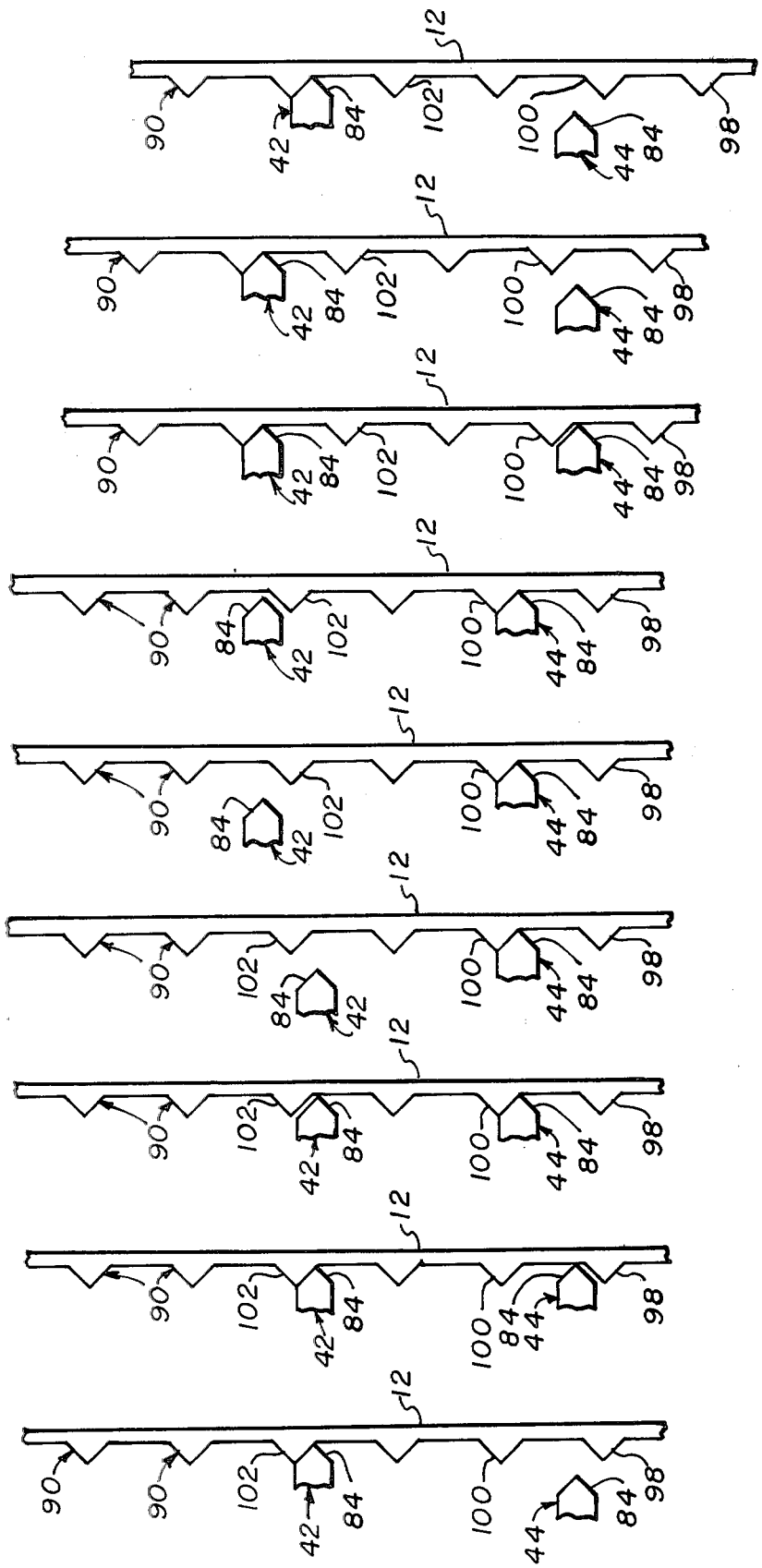

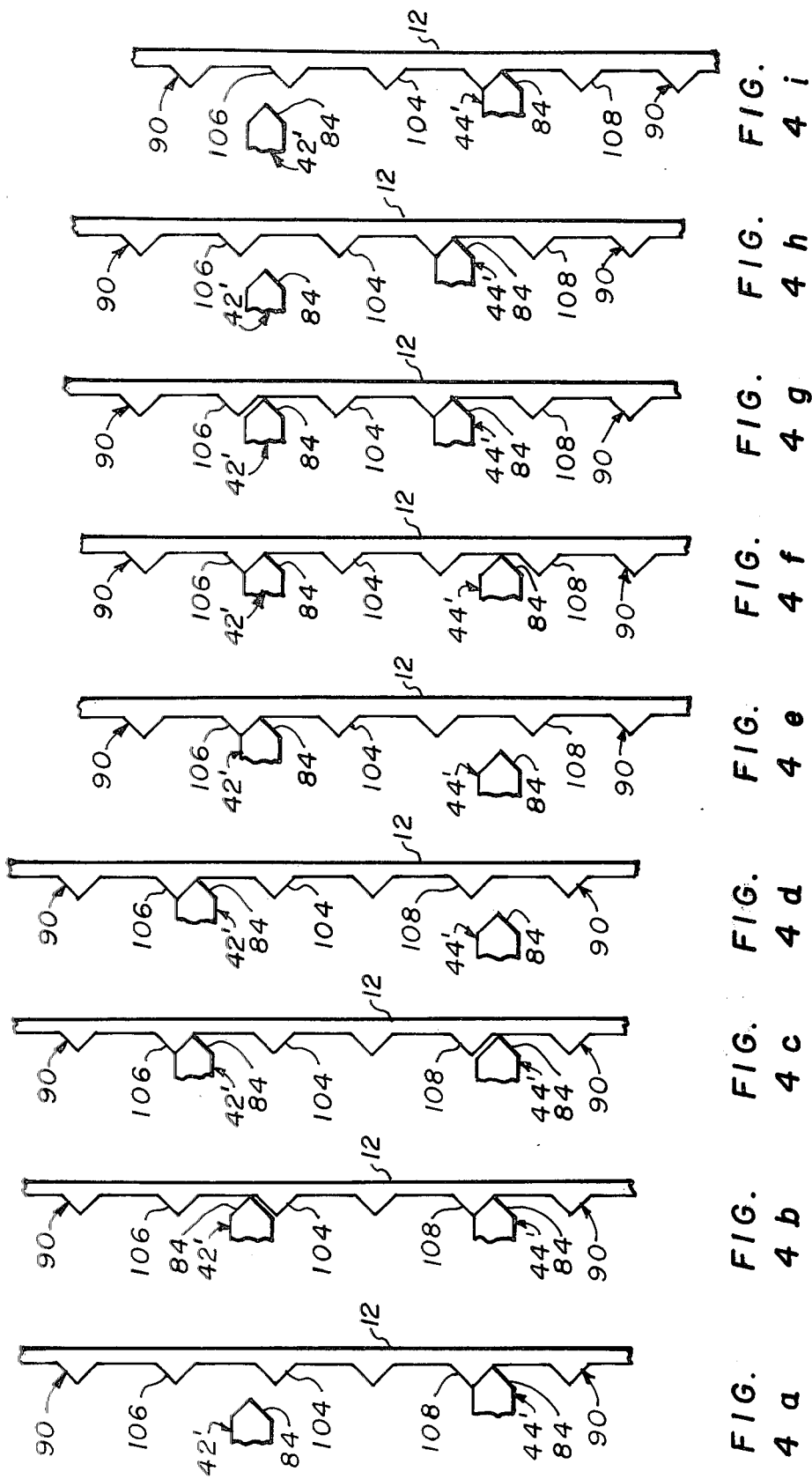

GRIPPER TYPE LINEAR MOTION DEVICE

BACKGROUND OF THE INVENTION

The present invention is directed to linear motion devices and more particularly to such devices having gripper assemblies for linearly moving an element in stepwise fashion.

Linear motion devices are particularly adapted to move various elements in a linear direction to any desired position, such as elements used in controlling a complex chemical process involving frequently a high temperature environment or for controlling various elements of a complex machine tool. Also, the elements to be positioned may be located within a sealed pressure vessel which requires some type of seal where the linear motion device enters the sealed vessel, such as the elements used in controlling the power output of a nuclear reactor.

Linear motion devices forming the prior art having utilized latching or gripper assemblies which are actuated by suitable actuating means, such as a solenoid coil, to cause engagement or disengagement of the element to be moved. Generally, the gripper assembly engages the element and moves it a small increment in the direction of desired linear motion at which point the element is engaged by a holding means. The gripper assembly is then decoupled from the element, returned to its initial position, and is again coupled to the element. At that time the holding means is decoupled from the element and the gripper assembly and the element are moved an additional increment in the aforementioned direction. With some such systems of the prior art, provisions have been made to remove the load placed on the gripper assembly by the element before the gripper assembly is decoupled therefrom. These devices have also included means for disposing the element relative to the gripper assembly so that frictional engagement of the gripper assembly and the linear element during the coupling portion of its cycle does not occur. This has been found desirable since continuous frictional engagement between the gripper assembly and the element during its coupling and decoupling portions of its cycle produces a substantial amount of wear on the grippers. As a result, frequent replacement of the grippers has been required and thereby limits the use of such linear motion devices in applications wherein frequent maintenance and repair is impractical.

In the aforementioned prior art gripper type linear motion devices having load transfer features, the load transfer function was generally provided by the holding means which comprised a second gripper assembly. The second gripper assembly was adapted to be moved into an engagable position between adjacent projections on the element and then adapted to be raised to engage the element and lift the element to remove the load from the first gripper assembly. While the second gripper assembly held the element, the first gripper assembly was decoupled frictionlessly from the element, returned to its initial position, and then coupled again frictionlessly to the element. Lowering of the second gripper assembly then transferred the load back to the first gripper assembly and removed the load from the second gripper assembly to permit frictionless disengagement thereof. Accordingly, such devices did eliminate excessive wear on the grippers with the resulting mechanisms having a substantially longer life of operation.

In many uses of such devices, such as control element drive mechanisms for nuclear reactors, it is important that the linearly movable element be positioned as accurately as possible. Since these types of apparatus can only operate in discrete steps, this requires relatively small steps of operation so as to obtain the desired accurate positioning. Furthermore, the size of the steps is limited by the fact that dynamic forces due to magnetic action in moving a slug or armature to a new position increase as the length or distance of movement increases. Therefore, while rapid movement would be a desirable feature of these drives, it is limited by the size of the step which may be taken in each cycle. Further still, with the gripper type linear motion devices as described hereinabove, only a single linear motion step occurs during each cycle of operation--that is, only one gripper assembly operates to move the element linearly while the other gripper assembly merely acts to transfer the load to permit coupling or decoupling frictionlessly of the first gripper assembly.

While a greater number of stepping motions in a single cycle could be achieved with use of a greater number of gripper assemblies, this would be undesirable since it would result in a larger sized and more expensive linear motion device. Furthermore, it would require a greater number of solenoid or magnetic coils which are extremely expensive to manufacture, especially for use in high temperature applications. Further still, such devices would still require one gripper assembly which is operative only to provide a load transfer function and which does not also operate to move the element an increment in a direction of desired linear motion. Accordingly, this results in at least one solenoid coil not being used for any purpose other than transferring the load.

One prior art device having two gripper assemblies, shown in U.S. Pat. No. 3,626,493, does disclose the idea of providing two stepwise motions in a single cycle. Such a device provides for more rapid movement of the linear element, or alternatively for a decrease in the size of each of the steps while maintaining the same rate of movement of the element. However this device cannot provide a load transfer feature for both raising and lowering of the linearly movable element, or if a load transfer function is provided, the element can only be moved in one direction. As can be appreciated, especially with respect to control element drive mechanisms for nuclear reactors, incremental motion in either of two opposed directions is highly desirable.

It is to be noted in connection with all the prior art gripper type linear motion devices that the projections or teeth on the linearly movable elements are closely spaced from one another so that when the gripper assembly is moved into an engagable position between adjacent teeth, only a small gap exists between the gripper assembly and the adjacent teeth. While such an arrangement has produced successful operation for single step gripper type linear motion devices, it has not proven acceptable where two stepwise motions are performed in a single cycle by a minimum number of gripper assemblies each of which is operative to provide load transfer features.

SUMMARY OF THE INVENTION

Accordingly, there is disclosed herein an improved gripper type linear motion device which overcomes the above discussed and other disadvantages of the prior art by utilizing load transfer features and by being adapted to produce two stepwise motions in a single cycle. The linear motion device of the present invention comprises a longitudinally movable element having a plurality of laterally extending projections thereon, a support means, a pair of latching means supported on the support means and each of which is movable into an unlatched position, a coupled position, and a latched position with respect to the elements, and means for moving each of the latching means between a raised and a lowered position relative to the support means. The latching means are supported in spaced relationship on the support means and the laterally extending projections are spacedly positioned on the linearly movable element so that each latching means is movable, when in its lowered position with respect to the support means, into a coupled position with respect to the element when the other latching means is latched to the element and is in its raised position or its lowered position with respect to the support means. With this spacing, load transfer is automatic during operation of the linear motion device to move the element in a stepwise fashion. Also, two stepwise motions are achieved in each cycle of operation.

Accordingly, with use of the present invention the linearly movable element can be moved more rapidly than with prior art devices and in a manner which does not cause excessive wear on the latching means or the projections. Furthermore, the magnetic or solenoid coils for moving the latching means into engagable relationship with the element and for moving the latching means longitudinally are of a smaller relative size since the size of the steps which the armatures must be moved is less than with similar prior art devices. Also, the number of coils necessary to effect the desired movement of the element is minimized which thereby results in a relatively smaller sized linear motion device and correspondingly, in a less expensive apparatus.

BRIEF DESCRIPTION OF THE DRAWINGS

FIGS. 2a through 2i are schematic side elevation views of the latching means and the linearly movable element illustrating the proper sequential operation of the linear motion device of the present invention for raising the linearly movable element;

FIGS. 3a through 3i are schematic elevation views similar to those shown in FIGS. 2a through 2i, but illustrating the proper sequential operation of the linear motion device for lowering the linearly movable element; and FIGS. 4a through 4i are schematic side elevation views similar to those shown in FIGS. 3a through 3i, but illustrating an alternative embodiment of the present invention and an alternative sequence of operation for lowering the linearly movable element.

DESCRIPTION OF THE PREFERRED EMBODIMENT

Figure 1A:
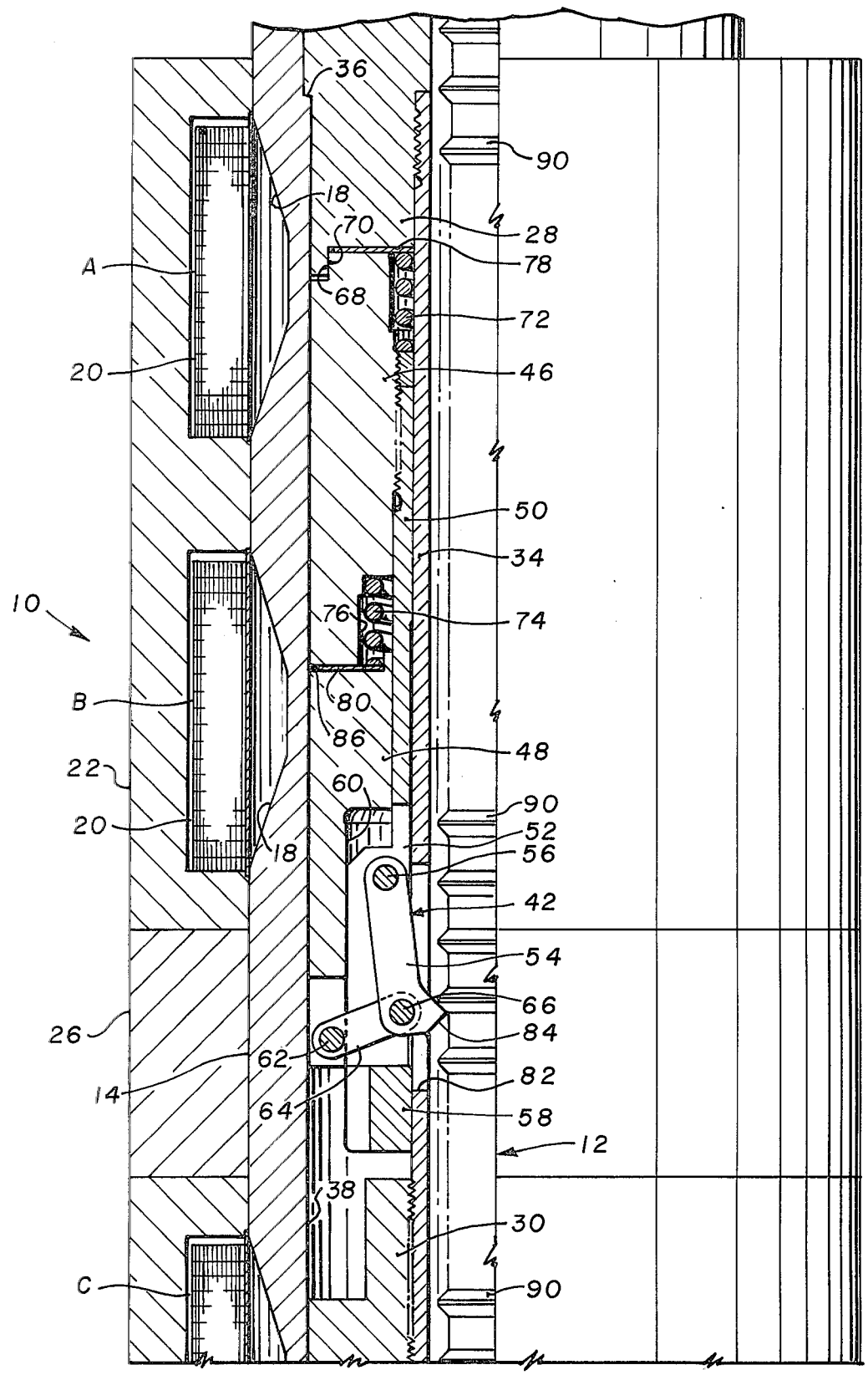
FIGS. 1a and 1b represent a sectional side elevation view of the linear motion device of the present invention.

For purposes of describing the present invention, it will be noted that the gripper assemblies or latching means of the linear motion device may be located in three relative positions with respect to the linear element which is to be moved thereby. One of the aforesaid relative positions is defined as the "unlatched" position wherein the gripper arm is not in position for engagement with the teeth or other suitable projections on the linearly movable element. A second relative position is defined as the "latched" position wherein the gripper arm of the latching means is engaged with the linearly movable element and wherein the gripper is subjected to the load or weight of the linearly movable element. The third relative position of the components is defined as the "coupled" position wherein the gripper arm is located in its engaged position relative to the linearly movable element but the gripper is not subjected to the load created thereby. In other words, a clearance or gap exists between the teeth of the linearly movable element and that portion of the gripper arm which engages the teeth or projections when the gripper is in its latched position.

It will therefore be understood that the difference between the latched position and the coupled position of the gripper relative to the linearly movable element exists not with respect to the radial position of the gripper inasmuch as the radial position of the gripper would be the same, but by virtue of the different axial positions of the gripper with respect to the linearly movable element. In the latched position, the element is in an axial position wherein the gripper actually engages one of the projections or teeth on the element and is thereby subjected to the load thereof. For the coupled position, the linearly movable element is in an axial position wherein the gripper is located between adjacent teeth and does not engage any teeth and thus is not subjected to the load of the element. It is to be noted that when the gripper is in its coupled position with respect to the linearly movable element the size of the gap between the gripper and the projections or teeth on the element need not be of any specific dimension and in fact can vary from a very small gap (e.g. 1/32 inch) to a relatively large gap (e.g. ⅜ inch or greater) for the specific arrangement shown herein.

Referring now specifically to FIG. 1, there is illustrated a linear motion device 10 constructed in accordance with the principles of the present invention for linearly moving a longitudinally extending element 12. The linear motion device 10 is provided with a tubular outer housing 14 which surrounds the element 12 to be moved and which is suitable for use in a highly pressurized system. In particular the housing 14 is formed of a magnetic material, such as ferritic steel, of a thickness capable of withstanding internal pressures on the order of 2,000 psi and is formed, for certain applications, to seal hermetically the interior of the housing 14. Linear motion devices having such a housing 14 are particularly useful as control element drive mechanisms for nuclear reactors. In such a use, the tubular housing 14 is mounted and secured at its lower end to a nozzle 16 extending out from the top of a reactor pressure vessel (not shown). The element 12 to be moved is axially disposed within the housing 14 and is adapted to extend through and into the reactor vessel. The housing 14 provides a hermetic seal for the element 12 by being sealed at its lower end to the nozzle 16 and by being sealed at its upper end by means of a tubular extension (not shown).

The housing 14 is provided with recesses 18 extending inwardly from its outer surface at various locations along its axial length. These recesses 18 are such as to reduce the wall thickness to the limit that is permissible to withstand the internal pressure within the housing 14. The function of these recesses 18 along the axial length of the housing 14 is to make it easier to magnetically saturate this region of the housing 14 than would be possible if the housing 14 were formed having a constant thickness. By saturating these regions along the axial length of the housing 14 a substantial working field in parallel therewith can be developed inside the housing 14 and through the armatures or slugs thereat to effect desired operation as more fully described hereinbelow. Alternatively, a plurality of circumferential weld inserts formed of a non-magnetic material could be employed at these regions along the axial length of the housing 14 which would act to interrupt a shunting magnetic path which would otherwise exist along the housing were the housing 14 formed completely of magnetic material. This interruption would cause the magnetic flux to pass inwardly of the housing 14 to effect the desired operation.

The housing 14 is provided with a plurality of annular solenoid coils 20 snugly disposed about the housing 14 and mounted in an axially spaced array on the outer surface thereof in positions juxtaposed respectively to the recesses 18. In particular, only four solenoid coils 20 are provided on the housing 14 to form solenoids A, B, C and D for the linear motion device 10. The solenoid coils 20 are supported in a support structure, generally 22, which in turn is supported on the housing 14 at its lower end by means of an annular shoulder 24 formed on the outer surface of the housing 14. The appropriate axial spacing of the solenoid coils 20 is achieved, where appropriate, with the use of a spacer 26. These solenoid coils 20, when actuated, act to produce a magnetic field within the interior of the housing 14 so as to cause movement of slugs or armatures 16 to effect lifting, lowering, latching and unlatching of the element 12 to be moved as described hereinbelow.

Viewing now the interior of the housing 14, it is noted that three stationarily mounted annuli 28, 30, 32 are axially spaced therein adjacent the inner side wall of the housing 14. The three stationary annuli are maintained in spaced relationship by means of a sleeve 34 threadedly connected to each of the annuli 28, 30, 32. Relative rotation of the annuli is prevented by appropriate means (not shown) such as locking pins or locking rings. The upper annulus 28 is supported on a shoulder 36 at the upper end of the housing 14 and in turn supports and locates the remaining stationary annuli 30, 32 with respect to the solenoid coils 20. Again, appropriate means (not shown) are provided for insuring against relative rotation and relative vertical movement between the sleeve 34, the annuli 28, 30, 32 and the housing 14. These annuli 28, 30, 32 define a pair of recesses 38, 40 between the sleeve 34 and the inner wall of the housing 14 into which are positioned respectively upper and lower latching means or gripper assemblies 42, 44 and associated components. Additionally, these annuli 28, 30, 32 effectively act as stops for the slugs or armatures received within the recesses 38, 40.

Although not necessary for practice of the present invention, in the preferred embodiment the associated components in the upper and lower recesses 38, 40 for effecting engagement, disengagement and longitudinal movement of the upper and lower gripper assemblies 42, 44 respectively are identical. Accordingly, only the components and arrangements thereof in the upper recess 38 will be described with like components positioned in the lower recess 40 being denoted by like reference characters. It is to be noted however, that identity of the gripper assemblies 42, 44 and the associated components is not necessary for practice of the present invention and that different arrangements can be employed for effecting engagement, disengagement and longitudinal movement of the gripper assemblies.

In the upper recess 38, there is provided a pair of annular support members 46, 48 which are movable between the upper and central stationary annuli 28, 30 and which also act as the armatures or slugs for effecting engagement, disengagement and longitudinal movement of the upper gripper assembly 42. The upper support member 46 is provided with a tubular extension 50 threadedly secured to the inner periphery thereof and which in turn is provided adjacent its lower end with a plurality, usually three, of gripper arm supporting members 52. The gripper arm supporting members 52 each have outwardly flared portions adjacent the lower end thereof and to which the gripper arms 54 of the gripper assembly 42 are pivotally supported by means of pins 56. A lower stop ring 58 is connected to the lower end of the gripper arm supporting members 52 and effectively acts to limit the downward movement of the upper support member 46 by engaging the upper surface of the central stationary annulus 30. The lower annular support member or armature 48 is positioned between the tubular extension 50 and the inner wall of the housing 14 beneath the upper annular support member 46 and is provided with a circumferential recess 60 on the inner surface thereof adjacent the lower end, in which recess 60 the outwardly flared portions of the gripper arm supporting members 52 and the gripper arms 54 are disposed. The lower end of the lower annular support member 48 pivotally supports by means of pins 62 a plurality of link members 64 of the gripper assembly 42. The link members 64 in turn are each pivotally connected in appropriate recesses by pins 66 to the gripper arms 54. The circumferential recess 60 adjacent the lower end of the lower annular support member 48 is such that the lower support member 48 may slide downwardly and outwardly of the lower stop ring 58 of the upper annular support member 46.

The upper annular support member 46 is provided with a circumferential recess 68 on the outer surface thereof adjacent its upper end so that it may move upwardly and be received within an annular opening 70 on the lower surface of the upper stationarily supported annulus 28. Biasing means 72 such as a helical spring is provided along the inner surface of the upper annular support member 46 adjacent its upper end which engages the upper annulus 28 and the tubular extension 50 so as to bias the upper annular support member 46 apart from the stationarily supported annulus 28. Also a second biasing means 74 such as a helical spring is supported between the two annular support members 46, 48 in a circumferential recess 76 adjacent the lower end of the upper support member 46 to bias the two support members 46, 48 apart. Non-magnetic shock absorbing washers 78, 80 are positioned on the upper annulus 28 and the lower annular support member 48 to absorb impact on movement of the upper and lower support members 46, 48 toward engagement with the upper annulus 28 and the upper support member 46 respectively.

As can be appreciated, movement of the upper and lower annular support members 46, 48 together will cause the gripper arms 54 to be pivoted inwardly through appropriate openings 82 in the stationary tubular sleeve 34 so that the tips 84 of the gripper arms 54 are placed inwardly of the sleeve 34. This arrangement is shown in FIG. 1a for the upper gripper assembly 42. The movement of the upper and lower support members 46, 48 together is accomplished by energization of either gripper actuating coil B for the upper gripper assembly 42 or gripper actuating coil D for the lower gripper assembly 44 to produce a magnetic field within the housing 14 to cause the two support members 46, 48 to move to close the gap 86 therebetween. De-energization of either of the gripper actuating coils B and D releases the magnetic force produced thereby and the biasing spring 74 moves the support members 46, 48 apart to move the gripper arms 54 outwardly of the tubular sleeve 34 to place the gripper assembly in an unlatched or disengaged position. This is illustrated for the lower gripper assembly 44 in FIG. 1b. Energization of either of the gripper lifting coils A or C causes the respective upper annular support members 46 to be moved upwardly and thereby cause longitudinal movement upwards of the respective gripper assemblies 42, 44 relative to the housing 14. The position of the upper annular support slugs 46 when this energization of a lift coil occurs is illustrated in FIG. 1a for the upper support member 46 of the upper gripper assembly 42.

The description thus far is in accordance with conventional linear motion devices having gripper type latching means. In some prior art devices additional coils were provided to insure disengagement or separation of the slugs or armatures from one another, or movement of the gripper arms both radially and longitudinally was caused by a single coil through the use of mechanically coupled armatures. The present invention differs however from the prior art in the spacing between adjacent teeth or projections on the element to be moved and in the spacing between the two gripper assemblies.

Figure 1B:
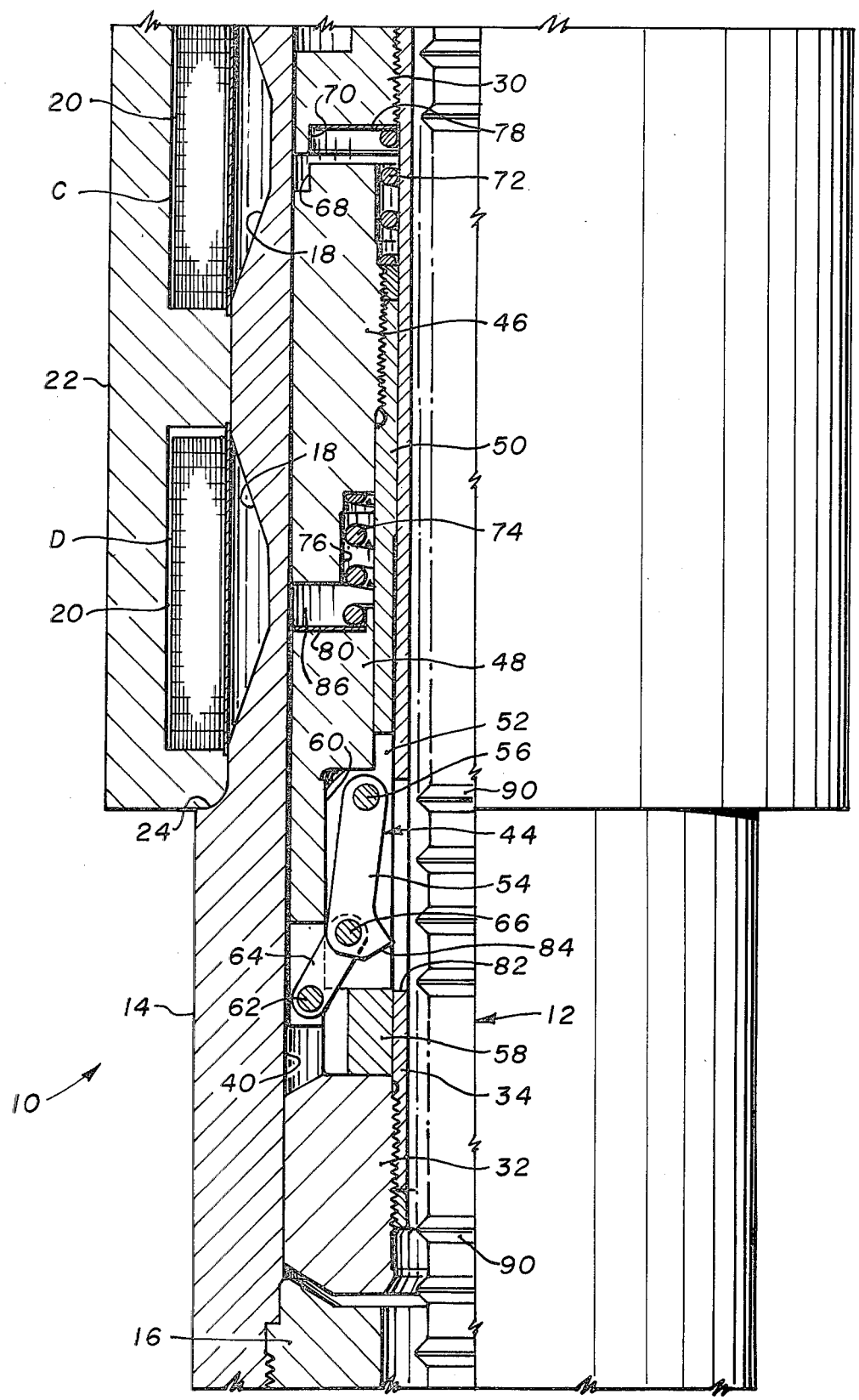

As can best be seen from FIG. 1a and 1b, the laterally extending projections 90 on the linearly movable element 12 are spaced a greater distance apart than that required for the tips 84 of the gripper arms 54 to just fit between adjacent projections 90. In the preferred embodiment the laterally extending projections 90 are actually spaced such a distance that one full laterally extending projection could be placed therebetween. In essence, this provides an arrangement wherein every other projection on the element 12 is missing. In particular, on the linearly movable element 12 of the present invention, respective portions of adjacent laterally extending projections 90 are spaced ¾ inch apart. The axial width at the base of the projections or teeth 90 is 5/16 inch and the axial or longitudinal gap between adjacent teeth 90 at their base is 7/16 inch. The slope of each of the teeth 90 corresponds substantially to the slope of the gripper tip 84 so that the tip 84 will mate with one of the projections 90 when a gripper arm 54 is in its latched position with respect to the linearly movable element 12. This is in contrast to prior art devices, wherein the teeth on the linearly movable element were closely spaced so that the gripper tips 84 could just fit between adjacent teeth and leave a small gap on either side thereof, i.e., with respect to the lower surface of the axially above tooth and the upper surface of the axially below tooth. For example, with prior art linear elements having teeth or projections of generally same size as those described hereinabove for the present invention (i.e., axially width of 5/16 inch), a 1/16 inch longitudinal gap was provided between the bases of adjacent teeth.

As hereinabove noted, one of the features of the present invention is that two incremental movements are achieved in each cycle of operation. To accomplish this it is necessary that both sets of latching means or gripper assemblies 42, 44 be incrementally longitudinally movable. By incrementally movable, it is not meant that a gripper assembly moves only a short distance to provide a load transfer feature only, but instead it additionally acts to advance the element 12 in the direction of desired movement. As will be shown hereinbelow, each gripper assembly 42 or 44 first moves the longitudinally movable element 12 to transfer the load or remove the weight of the element 12 from the other gripper assembly, and then additionally moves the element 12 approximately one-half of the distance to be accomplished in one cycle. Longitudinal movement of the gripper assemblies 42, 44, and thus the element 12, is achieved by movement of the upper annular support member 46 in the recesses 38, 40 in the housing 14. In the embodiment shown, the upper support member 46 for the lower gripper assembly 44, and accordingly the lower gripper assembly 44 itself, is longitudinally movable 7/16 inch between its fully lowered position and its fully upper position while the upper support member 46 for the upper gripper assembly 42 and thus the upper gripper assembly 42 itself, is movable ⅜ inch between its respective lower and upper positions. Although either gripper assembly 42, 44 may be used as a holding gripper assembly for maintaining the elements 12 in a fixed position after completion of movement, in the preferred embodiment the upper gripper assembly 42 has been chosen as such since its solenoid coil, coil B, for maintaining the gripper assembly 42 in engagable relationship with the element 12 is furthest away from the reactor and thus is less subject to the high temperature thereat. Also, it is to be noted that in the preferred embodiment a cycle of operation will be completed after the linearly movable element 12 has been raised or lowered to its final position so that the lower gripper assembly 44 will be placed in its unlatched position and the element 12 held only by the upper gripper assembly 42.

In order to achieve automatic load transfer features and still be able to move the element 12 in either of the two longitudinal directions, the spacing between each gripper assembly 42, 44 is important as is the spacing between adjacent projections 90 on the element 12. In the preferred embodiment and for the arrangement shown where the upper gripper assembly 42 also acts as the holding gripper assembly, the spacing between tips 84 of the upper and lower gripper assemblies 42, 44 when both gripper assemblies 42, 44 are in their lowered and radial inward position is [(⅜ inch)($n$) + 1/32 inch] where n is an odd number. In particular, this spacing has been chosen as 14 21/32 inch.

The operation of a linear drive device 10 of the present invention for both withdrawal or raising and insertion or lowering of the element 12 will now be explained with specific reference being made to the schematic representations shown in FIGS. 2, 3 and 4. First, it should be recalled that each gripper assembly 42, 44 is movable into one of three positions with respect to the linearly movable element 12 - "unlatched", "coupled", and "latched". This involves two relative positions of the gripper arms 54 relative to the element 12 - non-engagable relationship for the "unlatched" position and engagable relationship for the "coupled" and "latched" position, the difference between the "coupled" and "latched" positions being whether the gripper assembly, 42 or 44, is subject to the load of the element 12 ("latched") or not subject to the load ("coupled") in which case the gripper tip 84 is located between adjacent projections 90 on the element 12. Also, each gripper assembly 42, 44 is movable with respect to the housing 14 between a fully lowered position (see for example, the longitudinal position of the lower gripper assembly 44 in FIG. 1b) and a fully raised position (see for example, the longitudinal position of the upper gripper assembly 42 in FIG. 1a).

In the schematic representation in FIGS. 2, 3 and 4, only a portion of the linearly movable element 12 and the gripper tips 84 of the upper and lower gripper assemblies 42, 44 are shown. Throughout the description hereinbelow of the operation of the linear drive device 10, reference will occassionally be made to energization and de-energization of certain of the coils 20 to accomplish a specified motion of the gripper assemblies 42, 44. In this situation then, reference should be made to FIGS. 1a and 1b to determine the corresponding positions of the armatures 46 and 48.

Referring now to FIGS. 2a through 2i, movement of the linearly movable element 12 in an upwards direction is achieved as follows. Initially, only coil B is energized to place the upper gripper assembly 42 in its latched and lowered positions with respect to the element 12 and the housing 14 respectively, the lowered gripper assembly 44 being in its unlatched and lowered positions (FIG. 2a). Next, coil A is energized to move the upper gripper assembly 42, and thus the element 12, upwardly ⅜ inch (FIG. 2b). With the upper gripper assembly 42 maintained in this latched and upper position, the lower gripper actuating coil D is energized to move the lower gripper assembly 44 into a coupled position with respect to the element 12 (FIG. 2c). When in this position, there is a 1/32 inch gap between the projection 94 and the gripper tip 84 of the lower gripper assembly 44. Next, coil A is de-energized to lower the upper gripper assembly 42 and to transfer the weight or load of the element 12 to the lower gripper assembly 44 (FIG. 2d). Coil B is then de-energized to move the upper gripper assembly 42 to its unlatched position (FIG. 2e). As can be appreciated, since the longitudinal spacing between adjacent teeth 90 is 7/16 inch and since the longitudinal movement of the upper gripper assembly 42 is ⅜ inch, and further since the element 12 is moved downwardly 1/32 inch during this operation, de-energization of both coils A and B in the specific sequence shown is not critical. Instead, de-energization of coils A and B could be simultaneous or coil B could be de-energized prior to de-energization of coil A and still the upper gripper assembly 42 would be freely moved to its unlatched position. Next, with both coils A and B de-energized and the upper gripper assembly 42 in its unlatched and lowered position, coil C is energized to move the lower gripper assembly 44, and thus the element 12, upwardly 7/16 inch (FIG. 2f). The upper gripper actuating coil B is then energized to move the upper gripper assembly 42 into a coupled position with respect to the element 12 (FIG. 2g). Again, there is a 1/32 inch gap between the gripper tip 84 of the upper gripper assembly 42 and the axially above projection 96 on the element 12. Next, coil C is de-energized to move the element 12 downwardly 1/32 inch to place the upper gripper assembly 42 in its latched position and the lower gripper assembly 44 in its coupled position (FIG. 2h) and then coil D is de-energized to move the lower gripper assembly 44 to its unlatched position (FIG. 2i). As with de-energization of both coils A and b, this de-energization of coils C and D can take place simultaneously, or in any desired order, so as to move the lower gripper assembly 44 from its latched and upper position to its unlatched and lowered position. This sequence described hereinabove completes one cycle of operation to effect stepwise movement of the element 12 in an upward direction. As can be appreciated, the element 12 has been moved upwardly a total of ⅜ inch, the longitudinal spacing between respective portions of the projections 90 on the element 12. Furthermore, with the arrangement and sequence of operations shown, load transfer features are automatically built-in such that each gripper assembly 42, 44 operates during a portion of its movement to transfer the load and operates during the remaining portion of its movement to incrementally raise the element 12.

Referring now to FIGS. 3a through 3i, the sequential operation of the linear drive device 10 for inserting or lowering of the element 12 is as follows. Again, the upper gripper assembly 42 is initially in its latched and lowered position and the lower gripper assembly 44 is in its unlatched and lowered position (FIG. 3a). First, coil D is energized to move the lower gripper assembly into engagable relationship with respect to element 12 (FIG. 3b). As will be noted from this figure, the lower gripper assembly 44 is in a coupled position since it does not bear the load of the element 12 and furthermore, does not engage or interfere with any projection 90 on the element 12. In this position, the gripper tip 84 of the lower gripper assembly 44 is spaced 1/32 inch above the axially lower projection 98 and 13/32 inch below the axially above projection 100. Next, coil C is energized to raise the lower gripper assembly 44 7/16 inch (FIG. 3c). This movement causes the lower gripper assembly 44 to latch to the element 12 and to raise the element 1/32 inch to transfer the load from the upper gripper assembly 42. This produces a 1/32 inch gap or space in between the gripper tip 84 of the upper gripper assembly 42 and the projection 102 on the element 12. With the lower gripper assembly 44 maintained in its latched and upper position, coil B is de-energized to move the upper gripper assembly 42 from its coupled position to an unlatched position (FIG. 3d). Next, coil A is energized to raise the upper gripper assembly ⅜ inch relative to the housing 14, the upper gripper assembly 42 remaining in its unlatched position (FIG. 3e). Coil B is then energized to move the upper gripper assembly 42 from its unlatched position into a coupled position with respect to the element 12 (FIG. 3f). When in this position, a 1/32 inch gap exists between the lower surface of the gripper tip 84 and the upper surface of the projection 102. Next, coil C is de-energized to move the lower gripper assembly 44 downwardly 7/16 inch with respect to the housing 14 (FIG. 3g). This in turn lowers the element 12 13/32 inch to place the upper gripper assembly 42 in its latched position and to place the lower gripper assembly 44 in a coupled position. Next, coil D is de-energized to move the lower gripper assembly 44 from its coupled position to its unlatched position (FIG. 3h). Then, with the lower gripper assembly 44 in its unlatched position, coil A is de-energized to lower the upper gripper assembly 42 and thus the element 12 ⅜ inch wherein the upper gripper assembly 42 is in its fully lowered position with respect to the housing 14 (FIG. 3i). This sequence completes one cycle of operation to effect stepwise movement of the element 12 downwardly, the net total of downward movment being ¾ inch. Again, as can be seen from these figures and from the description hereinabove, each gripper assembly 42, 44 is first placed in a coupled position with respect to the element 12 prior to its being placed into a latched position. Also, as with raising of the element 12, two incremental motions are achieved during each cycle of operation to produce more rapid movement of the element 12 while the size of the steps remains constant.

It should be noted that different sequential operations are possible with use of the linear drive device 10 of the present invention, particularly for insertion or lowering of the linearly movable element 12. Also, the arrangement of gripper assemblies may be modified so that the lower gripper assembly 44 will act as the holding gripper assembly upon completion of each cycle of operation. Examples of such variations are shown in the schematic diagrams of FIGS. 4a through 4i. In this arrangement, the spacing between the upper and lower gripper assemblies, 42' and 44', when both are in their fully lowered positions, is [(⅜ inch)(n) − (1/32 inch)] where n is an odd number. Also, the longitudinal movement for the upper and lower gripper assemblies 42' and 44' is 7/16 inch and ⅜ inch respectively. Although sequential operation similar to that shown in FIGS. 3 for lowering of the element 12 with respect to the housing 14 could be employed for the modified arrangement depicted in FIG. 4, an alternative sequence has been depicted in order to illustrate the versatility of the present invention. Initially, only coil D is energized to place the lower gripper assembly 44' in a latched and lowered position and to place the upper gripper assembly 42' in an unlatched and lowered position (FIG. 4a). First, coil B is energized to move the upper gripper assembly 42' to a coupled position with respect to the element 12 (FIG. 4b). In this position, the gripper tip 84 of the upper gripper assembly 42' is spaced above the axially below tooth 104 1/32 inch and below the axially above tooth 106 13/32 inch. Next, coil A is energized to raise the upper gripper assembly 42' 7/16 inch (FIG. 4c). This in turn places the upper gripper assembly 42' in its latched and upper position and raises the element 12 1/32 inch to transfer the load from the lower gripper assembly 44'. Next, coil D is de-energized to move the lower gripper assembly 44' from a coupled position to its unlatched and lowered position (FIG. 4d). Coil A is then de-energized to lower the upper gripper assembly 42', and thus the element 12, 7/16 inch (FIG. 4e). Next, coil d is energized to move the lower gripper assembly 44' from its unlatched position to a coupled position with respect to the element 12, the gripper tooth 84 of the lower gripper assembly 44' being spaced above the axially below tooth 108 3/32 inch (FIG. 4f). Next, coil C is energized to raise the lower gripper assembly 44' ⅜ inch (FIG. 4g). This in turn latches the lower gripper assembly 44' to the element 12 and raises the element 1/32 inch to transfer the load from the upper gripper assembly 42'. Coil B is then de-energized to move the upper gripper assembly 42' from its coupled position to an unlatched position (FIG. 4h). Finally, coil C is de-energized to lower the lower gripper assembly 44' and thus the element 12 ⅜ inch (FIG. 4i). This completes one cycle of operation to effect stepwise movement of the element 12 downwardly, the net total of downward movement being ¾ inch. Again, as with each of the sequential operations described hereinabove, each gripper assembly 42' and 44', is only moved into a latched position from a coupled position.

In the alternate sequential operation, depicted in FIGS. 4a through 4i, latching of both the upper and lower gripper assemblies 42' and 44' is accomplished by raising of the gripper assemblies 42', 44', by energization of coils A and C respectively. As can be appreciated, this creates an impact on the projections 90 of the element 12 which may or may not be desirable depending upon the speed and force with which the gripper assembly 42' and 44' impact. This is one reason for the sequential operations for insertion as shown in FIGS. 3a through 3i being preferred. There the element 12 is lowered by means of gravity as oppposed to a magnetic force to place the upper gripper assembly 42 in the latched position. A further alternative for the preferred form of sequential operation would involve operating the lower gripper assembly 44 of the arrangement shown in FIGS. 3a through 3i in the same manner as for the upper gripper assembly 42 so that there would be no impact loads on the projections 90 of the element 12. However, as can be appreciated, this would result in a decrease in the speed of operation, and accordingly, is not preferred. The possible detrimental effects in having one gripper assembly impact the projections 90 is not deemed significant.

It is to be noted that it is the combination of the spacing of the teeth or projections 90 on the linearly movable element 12 and the spacing of the gripper assemblies 42, 44 which allow the accomplishment of two incremental motions for the element in a single cycle of operation, whether the linear motion device 10 is being operated to raise or lower the element 12. The requirement for these spacings in order to produce this desirable effect while still incorporating load transfer features in the device 10 is that each gripper assembly 42, 44, when in its lowered position with respect to the housing 14, is movable into a coupled position with respect to the element 12 when the other gripper assembly is in its latched position with respect to the element 12 and in either its raised or lowered position with respect to the housing 14. This relationship exits in the linear motion device 10 of the present invention but does not exist with the prior art devices wherein the projections on the linearly movable element were closely spaced. Generally, when projections are closely spaced, the element can only be moved in one direction if a load transfer function is also to be accomplished.

Accordingly, there is herein disclosed a novel arrangement for a linear motion device 10 of the type having a plurality of gripper assemblies 42, 44 for engaging an element 12 to be moved. The device 10 is operative to effect two incremental steps or motion in a single cycle of operation, and yet possesses load transfer features to minimize wear or deterioration of the gripper elements and/or the projections on the linearly movable element 12. Furthermore, the device 10 is operative to move the element 12 in incremental steps in either of two linear directions. Further still, the number of magnetic or solenoid coils 20 for both moving the gripper assembly 42, 44 in engagement with the element 12 and for raising or lowering of the gripper assemblies, can be minimized. Still further, the timing for energization and de-energization of the coils 20 is not critical for accomplishing the desired motion of the element 12.

It will be understood that the embodiments shown and described herein are merely illustrative and that changes may be made without departing from the scope of the invention. What is sought to be protected herein is that which is recited in the appended claims.

What is claimed is:

1. Apparatus for axially moving a member comprising:
   a longitudinally extending shaft connected at one end to said member to be moved, said shaft having a plurality of longitudinally spaced laterally extending projections thereon, each of said projections having an upper surface and a lower surface and the minimum axial spacing between the lower surface of each of said projections and the upper surface of the next lower axially adjacent projection being of a first predetermined distance;
   a support means;
   first latching means supported on said support means and being adapted to be moved into an unlatched position, a coupled position, and a latched position with respect to said projections on said shaft, said first latching means when in said unlatched position being positioned in non-engagable relationship with said projections on said shaft, when in said latched position being positioned in engagable relationship with respect to said projections and being engaged with one of said projections to bear the load of said shaft, and when in said coupled position being positioned in engagable relationship with respect to said projectons but being positioned between adjacent projections so as not to be subject to the load of said shaft;
   first moving means for moving said first latching means longitudinally relative to said support means between a lower position and an upper position, the axial distance between said lower position and said upper position of said first latching means being of a second predetermined distance;
   second latching means supported on said support means and being adapted to be moved into an unlatched position, a coupled position and a latched position with respect to said projections on said shaft, said second latching means when in said unlatched position being positioned in non-engagable relationship with said projections on said shaft, when in said latched position being positioned in engagable relationship with respect to said projections and being engaged with one of said projections to bear the load of said shaft, and when in said coupled position being positioned in engagable relationship with respect to said projections but being positioned between adjacent projections so as not to be subject to the load of said shaft;
   second moving means for moving said second latching means longitudinally relative to said support means between a lower position and an upper position, the axial distance between said lower position and said upper position of said second latching means being of a third predetermined distance; and
   said first latching means and said second latching means being supported in spaced relationship on said support means and said predetermined distances being interrelated such that the following relationships exist:
   a. when said first latching means is in a latched position with respect to said projections and is in its upper position with respect to said support means, and when said second latching means is in a coupled position with respect to said projections and in its lower position with respect to said support means, one of said projections is a fourth predetermined distance above said second latching means;
   b. when said second latching means is in a latched position with respect to said projections and is in its upper position relative to said support means, and said first latching means is in a coupled position with respect to said projections and is in its lower position with respect to said support means, one of said projections is a fifth predetermined distance above said first latching means; and
   c. said first predetermined distance is greater than said second predetermined distance less said fourth predetermined distance and is also greater than said third predetermined distance less said fifth predetermined distance.

2. The apparatus of claim 1 wherein said fourth predetermined distance is equivalent to said fifth predetermined distance.

3. The apparatus of claim 2 wherein said third predetermined distance is equivalent to said second predetermined distance plus twice said fourth predetermined distance.

4. The apparatus of claim 3 wherein the distance between respective portions of adjacent projections on said shaft is twice said second predetermined distance and wherein the maximum axial width of each of said projections is equivalent to said second predetermined distance less twice said fourth predetermined distance.

5. The apparatus of claim 4 wherein said first latching means is supported axially above said second latching means on said support means, the axial spacing between said first latching means and said second latching means when both are in their respective lower positions being equivalent to said fourth predetermined distance plus an odd number of said second predetermined distances.

6. The apparatus of claim 4 wherein said first latching means is supported axially below said second latching means on said support means, the axial spacing between said first latching means and said second latching means when both are in their respective lower positions being equivalent to an odd number of said second predetermined distances less said fourth predetermined distance.

7. The apparatus of claim 4 wherein said first predetermined distance is greater than said maximum axial width of each of said projections on said shaft.

8. A linear motion device comprising:
   longitudinally movable element having a plurality of laterally extending spaced projections thereon;
   a support means;
   a pair of latching means supported on said support means each of which is adapted to be moved into an unlatched position, a coupled position, and a latched position with respect to said projections on said element, each of said latching means when in said unlatched position relative to said element being positioned in non-engagable relationship with said projections, when in said latched position being positioned in engagable relationship with respect to said projections and engaging one of said projections to bear the load of said element, and when in said coupled position being positioned in engagable relationship with respect to said projections but being positioned between adjacent projections so as not to bear the load of said element;

means for moving each of said latching means into engagable relationship and non-engagable relationship with respect to said projections on said element;

means for moving each of said latching means between a fully raised position and a fully lowered position relative to said support means; and said pair of latching means being supported in spaced relationship on said support means and said laterally extending projections being spacedly positioned on said shaft so that each latching means is movable, when in its lowered position with respect to said support means, into a coupled position with respect to said element when the other latching means is in a latched position with respect to said element and in either its fully raised position or its fully lowered position with respect to said support means.

* * * * *